July 30, 1946.  R. R. DONALDSON  2,404,951
SYSTEM FOR THE REMOTE CONTROL OF INTERNAL-COMBUSTION
ENGINES AND CLUTCHES EMPLOYED IN SHIP PROPULSION
Filed May 26, 1943  3 Sheets-Sheet 1

Robert R. Donaldson
INVENTOR.

BY Gerald B. Tjoflat his ATTORNEY.

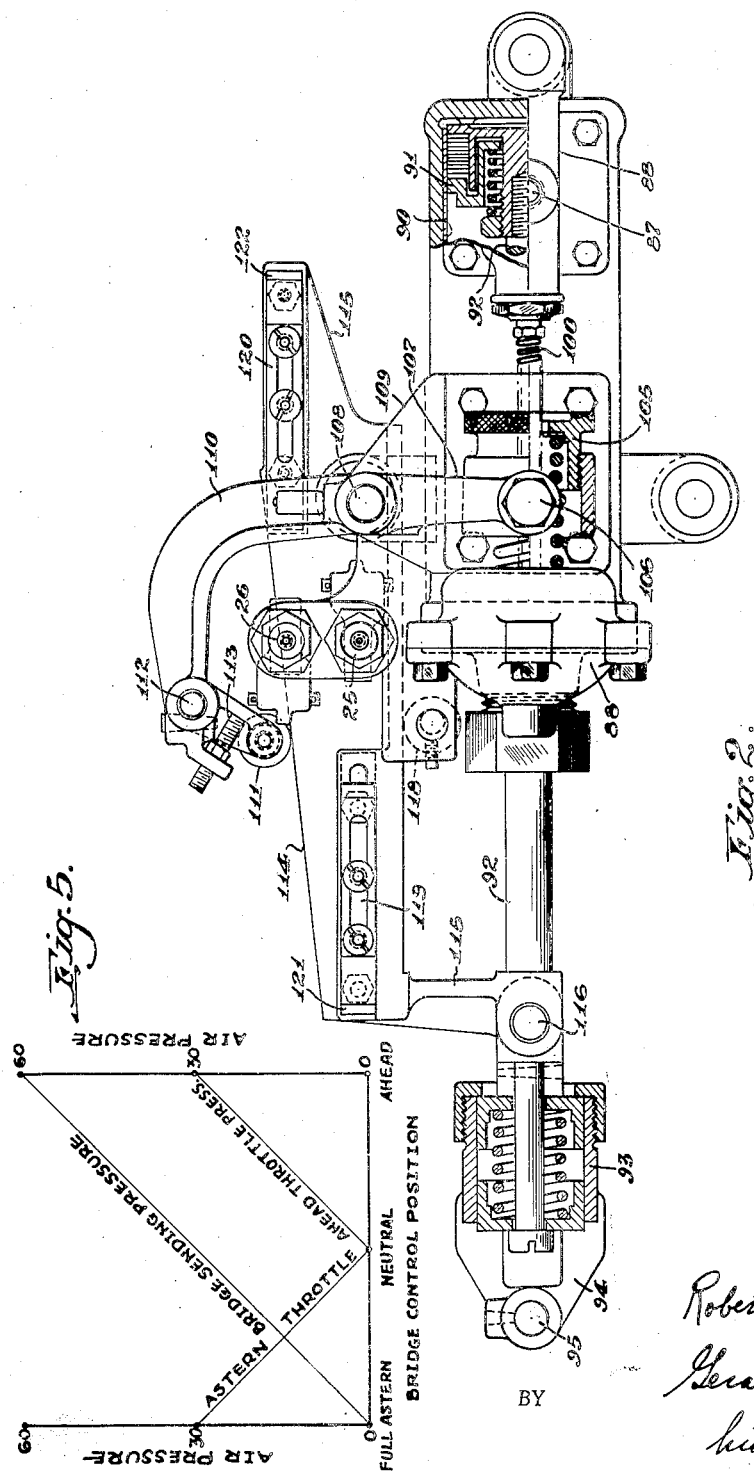

Patented July 30, 1946

2,404,951

UNITED STATES PATENT OFFICE 2,404,951

SYSTEM FOR THE REMOTE CONTROL OF INTERNAL-COMBUSTION ENGINES AND CLUTCHES EMPLOYED IN SHIP PROPULSION

Robert R. Donaldson, Forest Hills, Pa., assignor to John M. Hopwood, Mount Lebanon, Pa.

Application May 26, 1943, Serial No. 488,478

8 Claims. (Cl. 192—01)

This invention relates to a control system for ships, more particularly to a remote engine control system operable from the ship's bridge, which eliminates the need for the conventional telegraph system, and it is among the objects thereof to provide an interlocked clutch and throttle control which makes it impossible to operate the throttle control unless the ahead or astern clutch is engaged.

It is a further object of the invention to provide a remote control of engines by which it is impossible to accidentally disengage the clutch while the throttle is opened.

It is still a further object of the invention to provide a control system entirely operable by pressure fluid means in which the operating parts are always restored to a neutral position, and which cannot get out of step, regardless of the rapidity with which the bridge control is manipulated.

These and other objects of the invention will become more apparent from a consideration of the accompanying drawings constituting a part hereof in which like reference characters designate like parts, and in which:

Fig. 1 is an assembly of the complete engine control system in which the operating mechanisms are shown in cross-section and partially in elevation and are diagrammatically shown interconnected through a pressure fluid system to be operative in response to the bridge control;

Fig. 2 is a top elevational view partially broken away and shown in section of a reversing control operator;

Figure 4:
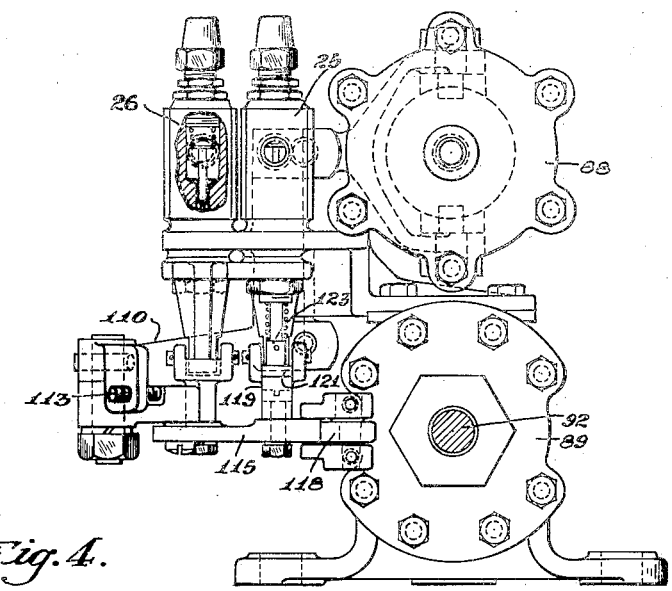
Figure 3:
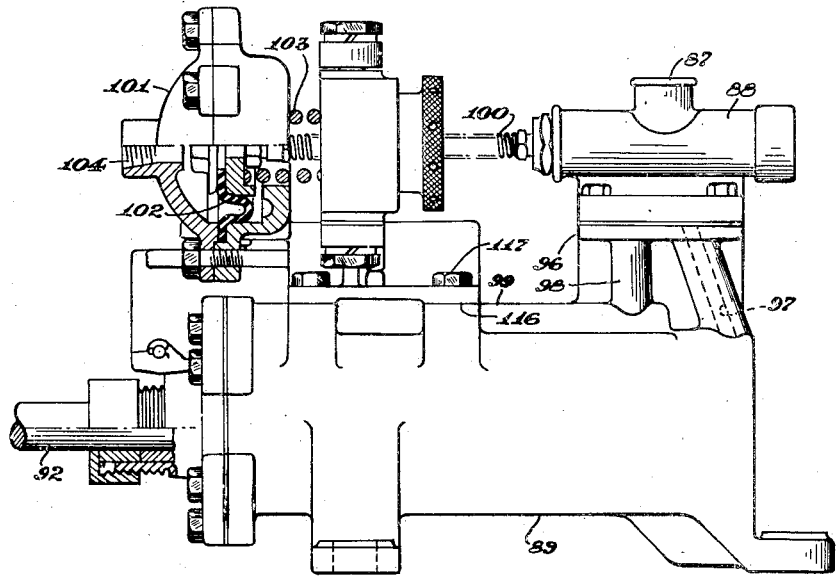

Fig. 3 a front elevational view thereof partially in cross-section;

Fig. 4 an end elevational view thereof partially in cross-section; and

Fig. 5 is a diagram illustrating the pressure fluid as applied and effective in the various positions of the bridge control.

With reference to Fig. 1 of the drawings, the structure therein illustrated comprises a bridge control unit generally designated by the numeral 1 consisting of a manual control lever 2 attached to a cam 3 which coacts with a cam follower 4 mounted on a plunger 5 which controls a valve 6 through a coil spring 7 acting against a pair of diaphragms 8 and 9.

Valve 6 controls a source of pressure fluid from line 6a and is provided with a stem 10, the end of which is seated on an orifice 11 which is closed when the valve 6 is unseated and opened so as to vent chamber 12 when the valve 6 is closed. A threaded connection 13 is provided in the chamber 12 for a conduit 14, which is connected at 15 to a relay generally designated by the numeral 16. Conduit 14 is also connected by a branch 17 to the diaphragm chamber 18 of a pilot valve controlling a reversing control operator generally designated by the numeral 19.

An indicator 20 is connected in the branch line 17 and a similar indicator (not shown) is connected to line 14 and is mounted in view of the bridge control operator above deck.

A selector valve generally designated by the numeral 21 is connected at 22 to a pressure fluid line 23 communicating at 24 with one end of the relay 16 and at the other end to an interlock valve 25 that is operated by the reversing control operator. A second interlock valve 26 actuated by the reversing control operator is connected by the pressure fluid line 27 to the other end of the relay 16 at 28.

The selector valve 21 is connected at 29 by pressure fluid conduit 30 to the relay at 31 and the selector valve is connected at 32 by pressure fluid conduit 33 to the relay at 34. The selector valve is further connected by pressure fluid conduit 35 at 36 to communicate with a throttle operator at 37, the throttle operator being generally designated by the numeral 38.

The relay 16 consists of a housing having an enlarged central chamber divided by a disk 39 into chambers 40 and 41 in which is suspended a valve body 42 by diaphragms 43 and 44. The cylindrical valve member 42 is provided with passages 45 and 46 having vents 47 and 48, respectively, and these passages are controlled by valve stems 49 and 50 of valves 51 and 52 which are biased by coil springs 53 and 54 to normally closed position.

The diaphragm 43 is preloaded by a coil spring 55 to predetermine the degree or value of pressure fluid required in chamber 41 to unseat the valve 52.

The operation of the relay 16 is briefly as follows:

With an air pressure supplied from the bridge controller through line 14 to the chamber 41 in excess of the loading spring 55, the cylindrical valve body 42 will be moved to the right and unseat valve 52, permitting a supply of pressure fluid from conduit 27 to pass through the communicating chamber to the conduit 30. When the pressure is reduced in chamber 41, the spring 55 will restore the normal position of the diaphragm 43, which permits valve 52 to close.

When the air pressure in line 14 is less than the calibrated pressure of spring 55, the spring will flex the diaphragms 43 and 44 to the left and move valve body 42 to unseat valve 51 to admit fluid pressure from valve 25 through line 23 to the chamber communicating with the conduit 33 leading to the selector valve 21.

The selector valve consists of a housing 57, a valve body 58 in which is disposed a plug 59 having a port 60 controlled by valve stem 61, one end of which is provided with a valve 62 controlling the flow of pressure fluid from line 33 into chamber 63 and thence through line 35 to the throttle controller 38.

The plug 59 is connected by a self-aligning spring 64 to a diaphragm 65 that is biased by a coil spring 66 to the normally closed position of valve 62, and is actuated by pressure impulse transmitted through the connection 22 from the line 23. When valve 51 of the relay 16 is open, valve 62 is also open, and the pressure fluid will flow through line 33 to the selector valve and from chamber 63 of the valve through line 35 to the throttle operator 38.

On the other hand, when there is no pressure on diaphragm 65 of the selector valve, valve 62 is closed and pressure fluid is delivered from line 30 through the connection 29, to valve chamber 63 and through line 35 to the throttle operator 38. The throttle operator 38 comprises a housing 67 of a power unit, comprising the diaphragm 68, which is biased by coil spring 69 to its normal off-position. The diaphragm is connected by a rod 70 to a link 71 at 72, one end of the link being fulcrumed at 73 to a bracket 74 integrally with the housing 67. The link or lever 71 is pivoted at 75 to the throttle lever 76.

Attached to the throttle operator housing 67 is a bracket 77, on which is pivoted a lever 78 at 79, the lever having an abutment 80 on which lever 71 of the throttle operator seats when in off-position. Lever 78 engages the flanged head 81 of a valve stem 82 that controls an interlock valve 83, which in construction is like the valves 51, 52, and 62 of the relay and the selector valve mechanisms.

Valve 83 is connected by a line 84 to a source of constant pressure fluid and the valve chamber is connected at 85 by conduit 86 leading to port 87 of a pilot valve 88 of the reversing control operator 19.

The function of the throttle operator will be hereinafter described in connection with the reversing control operator, which latter consists of an operating cylinder 89 which is partially broken away, Fig. 2, the cylinder having a liner 90 and a piston 91 attached to the end of piston rod 92. Rod 92 is provided with a spring coupling generally designated by the numeral 93, having a bracket 94 for connection with the clutch which is attached at 95, Fig. 2.

Figs. 3 and 4 of the drawings more clearly illustrate the relation of the pilot valve 88 to the operating cylinder 89, the pilot valve being mounted on a pad 96 formed integral with the cylinder housing.

The pilot valve is connected by a gland shown in dotted lines at 97 to the bottom of the cylinder 89 and through a similar gland passing through the ribbed portion 98, and thence along the top of cylinder 89 to the front of the cylinder so that, through the pilot valve control, piston 91 will move in either direction according to whichever end of the cylinder the pressure fluid from valve 83 is applied.

The pilot valve is of the usual spool valve construction, which in its neutral position blocks the ports controlling the flow of pressure fluid through glands 97 and 98, Fig. 3. When the valve is moved in either off-position, pressure fluid will be delivered through the connection 87 from the pressure source to the one end of operating cylinder, and exhausted from the other end of the cylinder. The pilot valve is operated through a spring connection 100 which is self-aligning with a diaphragm operator generally designated by the numeral 101 and which contains a diaphragm 102 that is so normally biased by a coil spring 103 that when there is no pressure fluid applied to diaphragm 102, spring 103 will actuate the pilot valve 88 to on position astern, and that when the fluid pressure acting on diaphragm 102 exerts a force equal to the normal bias force of spring 103, the pilot valve will be in neutral or "off" position.

The diaphragm operator is connected at 104, as shown in Fig. 1, to the conduit 17 leading to the bridge controller. The diaphragm-biasing spring 103 seats in a cup-shaped member 105 having trunnions 106 on which is pivoted a yoke 107 that is keyed to a shaft 108 carried by a bracket 109 formed integrally with the cylinder housing.

An arm 110, is also keyed to shaft 108 and is curved, as shown, to carry a cam follower 111 pivoted to arm 110 at 112, the cam follower abutting an adjustable stop 113.

The follower 111 contacts an angling bar 114 carried by bracket 115, attached at 116 to piston rod 92. Bar 114 slides against a roller 118 mounted on bracket 109 to take the thrust of the angling bar, as shown in Fig. 2. The function of the angling bar 114 is to counteract the pressure on diaphragm 102 by reloading the spring 103 to bring the clutch operating piston 91 to a stop after travelling a predetermined distance. When the balance of forces occurs pilot valve 88 will be in "off" position.

As described in connection with Fig. 1, a pair of interlocked valves 25 and 26 are mounted on the reversing control operator and are operated by movement of the angling bar 114 which carries slides 119 and 120, having stops 121 and 122, respectively, that operate the interlock valves 25 and 26. The slides are more clearly shown in Fig. 4 of the drawings with the stop 121 shown in engagement with the valve lifter 123, which when raised opens interlock valve 25 that is connected to a constant source of pressure fluid to connect said valve with conduit 23 leading to the relay 16, the valve remaining open for the length of travel of the slide, which constitutes a lost-motion device. Similarly, for movement of the operating piston in the opposite direction, valve 26 will be operated by stop 122 to connect a source of constant pressure to the relay 16 through conduit 27.

The operation of the control system will now be described in connection with the pressure diagram shown in Fig. 5 of the drawings.

With bridge control unit 1 capable of sending out a loading impulse of from zero to 60 pounds from the source 6a, as shown by the diagonal line designated bridge-sending pressure, and with the loading pressure from the bridge control unit at 30 pounds when in neutral, as shown by the short diagonal lines in the diagram, if the bridge control lever 2, Fig. 1, is moved in the ahead or forward direction, the pressure in the loading lines 14 and 17 will increase from 30 to say 40 pounds. This increase in pressure acting on diaphragm 102 of the reversing control operator will set the pilot valve 88 so as to connect the pressure from source 84 through the valve 83 with the bottom side of piston 91, Fig. 2, to move the piston rod 92 to the left, as viewed in Fig. 1, to engage the clutch for forward direction. When this point is reached, interlock valve 26 has been opened by the slide stop 122 and furnishes air pressure through line 27 to valve 52 of the relay 16.

Since the selector valve 21 is in the extreme left position, with no pressure on diaphragm 65, the air pressure through valve 52 passes from the relay 16 through line 30 to the selector valve and from the selector valve to the throttle operator 38.

Spring 69 of throttle operator 38 is preadjusted to require a pressure of say 2 pounds per sq. in. from line 35 before the throttle lever 71 is actuated to advance the throttle. Thus as the bridge pressure delivered to chamber 41 increases from 40 pounds per sq. in. to 42 pounds per sq. in., the pressure transmitted through pipe 30, valve port 60, and pipe 35 to the throttle operating diaphragm, increases from zero gauge to 2 pounds per sq. inch. The two-pound pressure is sufficient to depress diaphragm 68 against action of the spring 69 to move the throttle lever 71 off of contact with the valve stop 80, which immediately closes valve 83 and cuts off air pressure to the pilot valve 88, thus relieving pressure on the clutch operator 19 and preventing its operation until the bridge control unit is again returned to neutral.

By further moving the bridge control unit 2 in ahead or forward direction to increase the pressure in the loading line 14 and line 17 from 40 pounds to 60 pounds, the valve 52 of the relay 16 will repeat the increase in pressure by increasing its output through line 30 to the selector valve, and thence to the throttle operator from 2 pounds to 22 pounds, causing the throttle operator to open the throttle. Lost-motion is thus provided in the connection to the throttle, so that the first 2 pounds pressure will move the throttle lever 71 to disengage the valve stop 80 without opening the throttle. This allows time for the interlock valve 83 to shut-off the air from the source 84 to the reversing control operator pilot valve 88.

By returning the bridge control unit to its neutral or vertical position, the throttle operator is closed or returned to the position shown in Fig. 1, in the reverse manner until the pressure on diaphragm 68 reaches zero. In this position, the interlock valve 83 will immediately open by contact of lever 71 with the valve stop 80, making it possible for the bridge control unit to move the reversing control operator to the neutral position. Since by this movement interlock valve 26 is closed, the air supply to valve 52 of the relay 16 is cut off. When the operator moves the bridge control unit 2 to the opposite or astern position, the loading pressure from the bridge control unit will drop to 20 pounds, and with this pressure drop on diaphragm 102, spring 103 will move the pilot valve to connect pressure from source 84 to the upper side of piston 91 to move the clutch mechanism to the right for astern direction.

In this movement, interlock valve 25 is opened by the stop 121 to connect the air supply through line 23 with both the diaphragm chamber of the selector valve 21, to which it is connected at 22, and to valve 51 of the relay 16, through which it passes at outlet 34 and is delivered through valve 62 of the selector valve 21, which has been opened by the pressure on diaphragm 65 to deliver the pressure impulse through line 35 to the throttle operator diaphragm 68.

Again, the impulse transmitted by the relay 16 will be 2 pounds, just sufficient to move the throttle operator lever 71 out of contact with interlock valve 83 to shut off air pressure to the pilot valve 88, whereby engagement of the astern clutch is assured until the bridge control lever 2 is again returned to neutral.

After interlock valve 83 has been closed, further movement of the bridge control lever 2 in the astern direction will increase the pressure impulse to the throttle operator diaphragm 68 causing the throttle to open in the same direction as for forward speed.

As previously stated, the initial movement of the control lever 2 in either forward or astern position will cut off interlock valve 83, so that the clutch will remain set to the forward or astern direction.

When the bridge control lever is returned to neutral or off-position, the throttle lever 71 will abut its seat 80 and open interlock valve 83, which again connects pilot valve 88 of the reversing control operator with the source of air pressure 84. At this instance, the pilot valve 88 must be set to operate the power piston 92 to its declutching or neutral position.

The operation of the control system may be summarized by first assuming that the bridge controller lever 2 is in neutral or vertical position, and then considering the action of the clutch operator 19 in its relation to the operation of the throttle operator 38.

If the control lever 2 is in vertical position, the piston in clutch operator 19 may be caused to take a definite position on either side of its neutral or mid-position by merely moving controller lever 2 a fractional amount of its travel to either side of its neutral position. This is because for every value of pressure exceeding twenty pounds per square inch that is acting on diaphragm 102, the piston will move a predetermined distance to the left, as seen in Fig. 1, and come to a stop by reason of the fact that angle 114 will swing crank 110 clockwise until the force of spring 103 balances the force of the pressure acting on diaphragm 102. When this balance of forces occurs, pilot valve 88 will be in "off" position. To cause the piston in operator 19 to move further in the same direction, the pressure acting on diaphragm 102 must be further increased, and if it is increased to 40 pounds per sq. in. the piston will move to the end of its stroke, i. e. to the extreme left as seen in Fig. 1.

If the pressure on diaphragm 102 is decreased, the piston of operator 19 will move in the opposite direction, come to mid-position when the pressure on diaphragm 102 has decreased to 20 pounds per sq. inch, and will continue moving towards the right end of the cylinder as the pressure is reduced to zero gauge pressure.

From the above it is seen that so long as the piston of clutch operator 19 has not been moved to either the forward or astern clutching position, the piston may be caused to travel step-by-step in either direction from neutral.

If the bridge control lever 2 is in neutral position and it is desired to engage the "ahead" or "forward" clutch and to increase speed to full speed "ahead," the following operations take place: (a) the bridge-sending pressure in lines 14 and 17 is increased and when it has increased from 30 to 36 pounds per sq. inch the piston of the clutch operator will have reached the end of its stroke for engaging the forward or ahead clutch, and selector valve 26 opened to connect full supply pressure to pipe 27 and valve 52. When the sending pressure in pipe 14 has increased to 38 pounds per sq. inch, the pressure sent through valve 52, pipe 30, valve port 60, and pipe 35 to throttle diaphragm 68, will have increased to 2 pounds per sq. inch, at which time throttle lever 71 has been moved out of engagement with valve stop 80, causing valve 82 to close and shutting off the air supply to pilot valve 89 of clutch operator 19, thereby allowing spring 93 to expand, and partially return the piston to thereby relieve the clutch of pressure from the clutch operator.

As bridge controller lever 2 is moved further towards full speed ahead, the pressure in pipe 14 will increase, deflect diaphragm 43 of relay 16 to the right, and cause a still higher pressure to be sent to the throttle operator diaphragm 68.

It is to be noted that the reversing control operator cannot function to declutch until the throttle operator has returned to its off position to rest against the valve stop 80, at which time the interlock valve 83 will connect the reversing control operator to the pressure source 84.

Regardless of how fast the bridge control unit is moved from one extreme to the other, the mechanism will follow a definite sequence, and cannot get out of step. It is impossible to open the throttle operator unless one clutch or the other is engaged. It is impossible to disengage the clutch while the throttle is open. The spring mechanism 93 is provided so that the maximum pressure put on the clutch is limited and the pressure is released as soon as the clutch is engaged.

It is evident from the foregoing description of the invention that by the pressure fluid operating mechanisms and interlocked valves, an engine control system is provided that may be remotely operated from the bridge independently of the engine room.

It is further evident that such control system comprises a relatively few operating parts interlocked to each carry out its function conjointly with the other parts to bring about proper sequence of operations for either forward or astern movements.

Although one embodiment of the invention has been herein illustrated and described, it will be evident to those skilled in the art that various modifications may be made in the details of construction without departing from the principles herein set forth.

I claim:

1. In combination, a clutch operator and a throttle operator, a control system comprising pressure fluid means for actuating said operators in predetermined sequence, valve mechanism operative by said clutch operator when in clutch disengaging position for disconnecting the pressure medium from the throttle operator, and valve means operative by said throttle operator for delivering pressure fluid to the clutch operator when the throttle operator is disconnected from its fluid pressure source said valve mechanism re-connecting the fluid pressure source to the throttle operator when the clutch operator is in clutch engaging position.

2. In combination, a pair of prime movers, a control system comprising pressure fluid means for actuating said prime movers in predetermined sequence, one of said prime movers being fluid-pressure operated in one direction only, the other of said prime movers being fluid-pressure operated in two directions, valve means operative by said first-named prime mover while it is in its fluid pressure actuated range to disconnect the pressure fluid from the double-acting prime mover, and a plurality of valve means, one of which is operative by the double-acting prime mover when it has reached a predetermined position in one direction of its movement to control the application of fluid pressure to said single acting prime mover and the other of said valves being operative by movement of the double operating prime mover when it has reached a predetermined position in the opposite direction of its movement to control the application of the pressure fluid to said single-acting prime mover.

3. In a system for remotely controlling the operation of the clutch and throttle of ships, a fluid pressure actuated clutch operator and a fluid pressure actuated throttle operator, a bridge control unit for sending out pressure impulses of a predetermined range with an intermediate value corresponding to the neutral position of the controller, in which position said clutch and throttle operators are inoperative, a pressure relay connected to the bridge controller, a selector valve connected to the relay and to the throttle operator to transmit selected impulses from the relay to the operator for forward and reverse, a source of air supply for the clutch operator, a pilot valve for said clutch operator connected to the bridge controller to determine the forward or astern movement of the clutch in response to the transmitting pressure of the bridge control, interlock valves connected to the relay and operative in response to movement of the clutch operator and an interlock valve controlling the air supply to the clutch operator, said last-named valve being closed by the throttle operator in the initial movement thereof, said operators, relay, and selector valve being operative in response to the sending pressure of the bridge control unit, which in one position of the control moves the clutch to forward position and cuts off the pressure fluid to the clutch operator and for continuing movement of the bridge control in the same direction to operate the throttle for forward speed, and being further operative by movement of the bridge control in the astern direction to in the same manner set the clutch and actuate the throttle operator in accordance with a desired speed, said clutch and throttle operator being interlocked through the relay and selector valve and the interlock valves to return to the neutral or inoperative position upon the setting of the bridge control to neutral or zero position.

4. In a system for remotely controlling the operation of the clutch and throttle of ships, a reversing control clutch operator and a throttle operator, a valve operative by the throttle operator for cutting off pressure fluid to the reversing control clutch operator and interlock valves operative by movement of the reversing control clutch operator to supply fluid pressure to the throttle operator, said last-named valves being connected to a relay and said throttle operator being connected to a selector valve said relay having valved passages controlled by a valve body suspended by pressure diaphragms, a bridge control unit connected to a source of air supply and communicating with one side of said pressure diaphragm to operate the relay valves in response to sending pressure from the bridge control unit to thereby operate the relay valves to selectively transmit pressure fluid from the valves operated by movement of the reversing control clutch operator to the throttle operator, said relay being operative in the forward position of the bridge control unit to establish communication of the pressure fluid by movement of the reversing control clutch operator to its forward position to transmit a pressure impulse through the selector valve to the throttle operator and being further operative in the reverse direction of movement of the bridge control unit to communicate pressure fluid released by the astern movement of the reversing control clutch operator through the selector valve to the throttle operator.

5. A system for remotely controlling the operation of the clutch and throttle of ships as set forth in claim 4 characterized by the reversing control clutch operator having pressure connection with the bridge control unit to control the directional operation for forward and astern clutching engagement, and said reversing control clutch operator being further provided with means to return said operator to neutral position in response to movement of the bridge control to neutral position.

6. The system for remotely controlling the operation of the clutch and throttle of ships as set forth in claim 4, characterized by the selector valve being operative in response to pressure fluid supplied from the interlock valve opened by movement of the reversing control clutch operator to astern position to set the selector valve for delivering selective impulses from the relay to the throttle controller.

7. A system for effecting sequential control of the operation of the clutch and throttle of a prime mover, comprising a clutch operator, a source of fluid pressure for actuating said clutch operator to clutch engaging and disengaging positions, a pilot valve for controlling the direction of application of said operating fluid to the clutch operator to thereby control its direction of travel, fluid pressure means for actuating said pilot valve, a fluid pressure operated throttle operator, a source of operating pressure for said throttle operator, control means for delivering operating fluid pressure to said pilot valve operator and said throttle operator, means operated by said clutch operator for shutting off the supply of operating fluid pressure to the throttle operator when said clutch operator is in its clutch disengaging position, and means actuated by the throttle operator when in its idling position for connecting said pilot valve to its source of supply of operating fluid.

8. A control system for sequential operation of the operator for astern and ahead clutches and the operator of the throttle of a prime mover arranged to effect operation of the prime mover at speeds varying between idling and top speed when one or the other of the clutches is engaged while rendering the clutch operator inoperative during such operation of the engine, and to render the throttle operator inoperative while the clutch operator is in a clutch disengaging position or in motion to engage one or the other of said clutches, said control system comprising a manually operated control pressure sending device adapted to send out a progressively increasing control pressure when shifted from full astern through neutral to full ahead positions, a pilot valve for said clutch operator, pressure actuated means responsive to said control pressure for actuating the pilot valve, a source of operating fluid for the clutch operator under the control of said pilot valve, said pilot valve being arranged to cause the clutch operator to engage the astern clutch during the initial movement of the manually operated sending device from its neutral towards its full astern position and to cause the clutch operator to engage the ahead clutch, during the initial movement of said device from its neutral towards its ahead position, means responsive to the pressure sent out by said sending device for delivering a controlled but progressively variable operating pressure to said throttle operator as said sending device is moved from neutral towards either of its forward and astern positions, means operated by said clutch operator as it moves away from either of its clutch engaging positions for rendering said pressure responsive means inoperative to send operating pressure to said throttle operator, and means under the control of the throttle operator for disconnecting the clutch operator pilot valve from its source of operating fluid when the throttle operator has moved out of its idling position.

ROBERT R. DONALDSON.